July 4, 1950 — M. REESE — 2,514,092
ELECTRIC HEATING TOOL
Filed Jan. 24, 1948
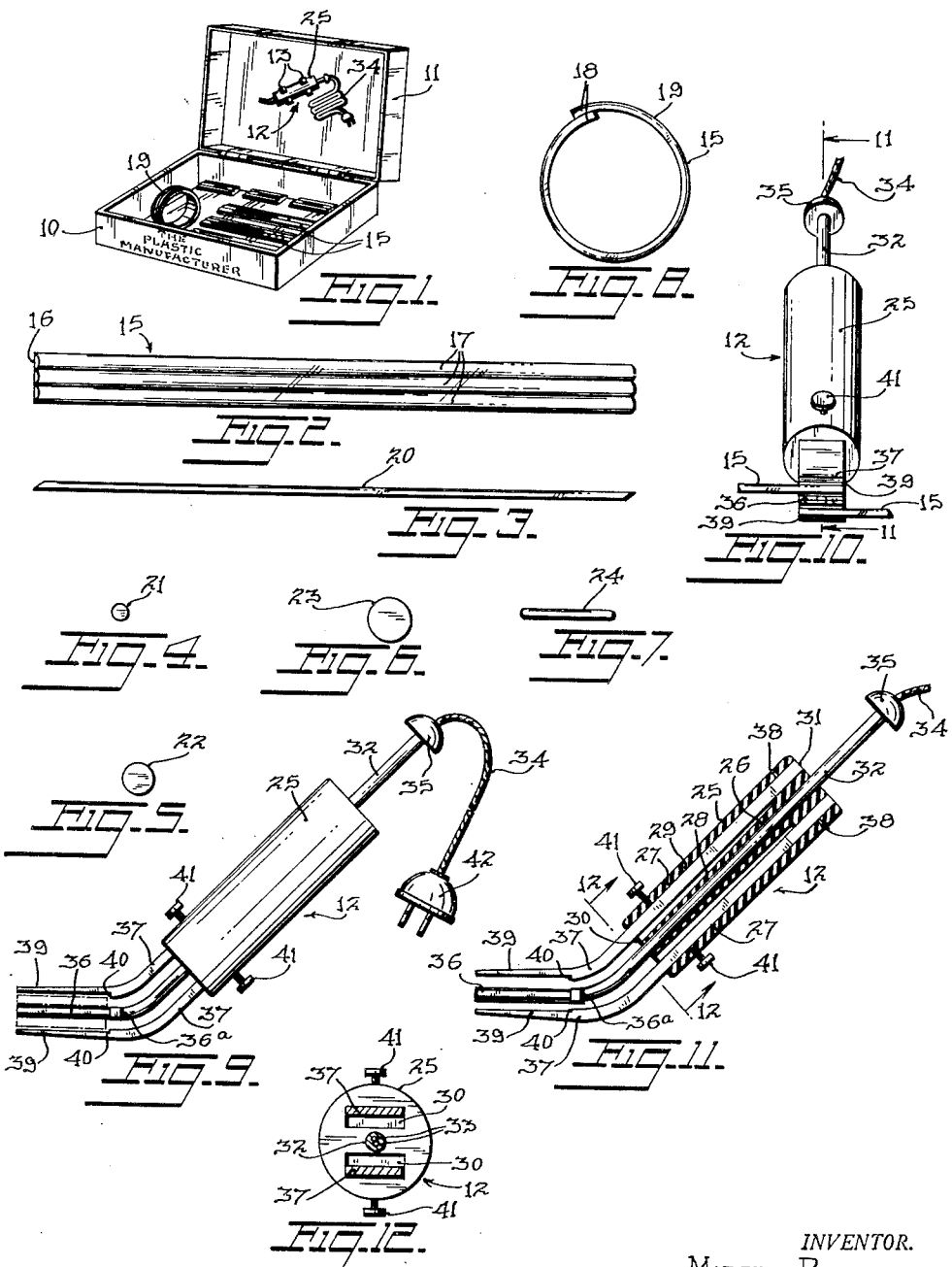
INVENTOR.
MARTIN REESE Patented July 4, 1950

2,514,092

UNITED STATES PATENT OFFICE 2,514,092

ELECTRIC HEATING TOOL

Martin Reese, Bronx, N. Y., assignor to Premier Industries Corporation, New York, N. Y.

Application January 24, 1948, Serial No. 4,177

2 Claims. (Cl. 219—21)

This invention relates to a plastic toy kit.

More particularly, the invention relates to a kit having the materials therein for fabricating plastic articles.

An object of the present invention is to provide a "Plastic Manufacturer," which is a kit having various shaped pieces of plastic and various other articles including an electric heating unit, whereby the plastic can be fabricated into different articles such as bracelets, napkin rings, belts, and the like.

A further object is to provide a kit as aforesaid which utilizes scrap pieces of plastic which would otherwise have to be wasted.

Another object is to provide a kit as aforesaid having a resistance heating unit of a type which adapts it especially for use with the plastic pieces of the kit.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a "Plastic Manufacturer" toy kit constructed in accordance with this invention.

Fig. 2 is a plan view of a plastic strip forming part of the contents of the kit.

Figs. 3–7 are end views of other plastic articles forming part of the kit.

Fig. 8 is a view of a bracelet made of the strip of Fig. 2.

Fig. 9 is a side view of a heating tool forming part of the kit, plastic strips being indicated in dot and dash lines.

Fig. 10 is a view looking at the right end of Fig. 9, the plastic strips being shown in full.

Fig. 11 is an enlarged section on the line 11—11 of Fig. 10, the plastic strips being removed.

Fig. 12 is a section on the line 12—12 of Fig. 11.

The "Plastic Manufacturer" toy kit comprises a case 10 having a hinged cover 11. A resistance wire electric heating tool 12 is held in the cover by bracelets 13. The case 10 contains many articles used in the manufacture of plastic articles by children. Some of these articles are various shapes and gauges of plastic pieces, most of which are scrap discarded in the manufacture of plastic articles industrially, scissors for cutting the plastic, eyelets for stamping into the plastic, buckles, such as ladies' and men's belt buckles, jewelry pieces, parts for forming suspenders, a tape measure, brushes, dyes, adhesive, a hammer, a block and punch, needles, small rivets which can be turned on the block and punch, and a stapling machine.

In Fig. 2 is shown an example of a plastic strip 15 which may have been a length left over in the manufacture of suspenders. One face 16 of the strip 15 is flat and the opposite face has three convex ridges 17. It may be turned into a circle and the overlapping portions 18 secured together as by heating and pressing, thus forming a bracelet 19, see Fig. 8. The heating is accomplished by the tool 12 and the pressing may be manually or by hammering the overlapping ends.

In Fig. 3 is shown the end edge of a rectangular sheet of plastic 20. Figs. 4–6 show end views of circular rods 21, 22 and 23 of plastic, and Fig. 7 shows an end view of a plastic strip 24 which is rounded at its side edges.

The tool 12 is shown in detail in Figs. 9–12. It has a Bakelite handle 25, round in cross section. The handle has a central cylindrical bore 26 and two substantially rectangular slots 27. Each slot 27 has its inner face 28 inclined relative to its outer face 29 so that the slot is deeper at the front end 30 than at the rear end 31.

A rod 32 is slidably mounted in bore 26, rod 32 being circular in cross section and having two longitudinal bores 33 for electric wires of an electric cord 34. At its rear end the rod 32 has a handle 35 and at its front end, a rectangular resistance wire heating element 36.

A finger 37 is disposed in each slot 27. The rear end portion of each slot has its portion of the faces 28 and 29 parallel, forming a rectangular socket, and each finger 37 at its rear end is rectangular in cross section and tightly fitted into the socket. Each finger is locked in its socket by a set screw 38. The fingers are of spring metal, and tend to lay next to the face 29, as shown in Fig. 11. When the rod is centralized relative to the handle 25, so that it has equal portions extending beyond the opposite ends of the handle 25, its forward portion extends forwardly to the ends of the fingers 37 and each finger has a portion 39 of the same length as element 36, and the same shape, except that the portion 39 tapers forwardly to a point and has a shoulder 40 at its inner end.

The fingers 37 can be pressed together manually toward the faces 28, and may be adjusted to positions toward these faces 28, if desired, by thumb screws 41 in the forward end portion of the handle 25. The electric cord 34 is provided with a plug 42 for insertion in a wall socket in the usual manner.

The operation of the tool is as follows:

At starting, the tool 12 is normally in the position shown in Fig. 11, wherein the finger portions 39 are spaced from the heating element 36. Assuming that the plug 42 is connected in a wall socket so that the heating element 36 is hot, the two plastic strips to be fused are placed one between one portion 39 and the heating element and the other between the other portion 39 and the other side of the heating element. Each plastic strip will abut against the adjacent shoulder 40. The fingers are urged together either by manually squeezing them together or by turning the screws 41 until they hold the plastic strips lightly against the heating element 36. As soon as it is found that the plastic strips have been sufficiently heated, the handle 35 is pulled rearwardly until the rear face 36ª of the heating element 36 abuts the front face of the handle 25. This withdraws the heating element from between the plastic strips, letting the heated surfaces of the plastic strips come together. The pressure on the fingers is increased so that the finger portions 39 force and hold the heated plastic strip portions together until they fuse. During the withdrawal of the heating element 36 from between the plastic strips, the plastic strips are held by the shoulders 40.

If desired the heating element may be extended beyond the finger portions 39 by pushing the handle 35 into contact with the rear face of the handle 25. The heating element then may be used as an ordinary soldering iron or heating means. It may be rotated freely by turning the knob or handle 35 so that it can be placed in any desired position. It may also be rotated between the finger portions 39 if desired. The heating elements 36 may be readily interchanged with other heating elements of various heat capacity.

The finger portions 39 are preferably of spring metal but they may be made of a hard springy plastic if desired.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A heating tool for heating portions of resinous plastic for fusing them together, comprising a handle circular in cross-section having a central cylindrical bore and two slots disposed one on each side of said bore, said slots having parallel outer sides and inclined inner sides diverging from the front end of said handle toward the rear end, each of said slots having its sides rectangular, each of said slots being rectangular at any cross-section along the length thereof, a rectangular flexible finger disposed in each of said slots and extending beyond the front end thereof, each of said fingers having its rear end portion snugly fitted in the rear end portion of its respective slot, said fingers normally being in contact with said parallel outer sides, each of said fingers having a shoulder in its inner face, a cylindrical rod slidably and turnably disposed in said bore and having its ends extending from the opposite ends of said handle, said rod having two electric wire bores, a heating element rectangular in cross-section disposed between said fingers and secured to the front end of said rod, a knob on the rear end of said rod, an electric cord having its wires extended through the bores of said rod and connected to said heating element, said heating element being aligned with the portions of said fingers forwardly of said shoulders so that two resinous plastic strips may be placed between said fingers and the adjacent sides of said heating element, and means for urging said fingers toward said heating element to engage the two resinous plastic strips against said heating element with the strips engaging the shoulders of said fingers, said heating element being withdrawable from between the plastic strips by rearward movement of said rod in said bore with said shoulders retaining the strips from movement, said heating element being movable to a position forward of said fingers by forward movement of said rod and being rotatable by rotation of said rod.

2. A heating tool for heating portions of resinous plastic for fusing them together, comprising a handle circular in cross-section having a central cylindrical bore and two slots disposed one on each side of said bore, said slots having parallel outer sides and inclined inner sides diverging from the front end of said handle toward the rear end, each of said slots having its sides rectangular, each of said slots being rectangular at any cross-section along the length thereof, a rectangular flexible finger disposed in each of said slots and extending beyond the front end thereof, each of said fingers having its rear end portion snugly fitted in the rear end portion of its respective slot, said fingers normally being in contact with said parallel outer sides, each of said fingers having a shoulder in its inner face, a cylindrical rod slidably and turnably disposed in said bore and having its ends extending from the opposite ends of said handle, said rod having two electric wire bores, a heating element rectangular in cross-section disposed between said fingers and secured to the front end of said rod, a knob on the rear end of said rod, an electric cord having its wires extended through the bores of said rod and connected to said heating element, said heating element being aligned with the portions of said fingers forwardly of said shoulders so that two resinous plastic strips may be placed between said fingers and the adjacent sides of said heating element, and means for urging said fingers toward said heating element to engage the two resinous plastic strips against said heating element with the strips engaging the shoulders of said fingers, said heating element being withdrawable from between the plastic strips by rearward movement of said rod in said bore with said shoulders retaining the strips from movement, said heating element being movable to a position forward of said fingers by forward movement of said rod and being rotatable by rotation of said rod, said finger urging means, comprising thumb screws threaded through diametrically opposite sides of said handle and bearing against the outer faces of said fingers.

MARTIN REESE.

REFERENCES CITED

The following references are of record in the file of this patent:

UNITED STATES PATENTS

| Number | Name | Date |
|---|---|---|
| 728,883 | Downes | May 26, 1903 |
| 1,139,069 | Pfanstiehl | May 11, 1915 |
| 1,422,826 | Brown | July 18, 1922 |
| 2,146,979 | Paolicelli | Feb. 14, 1939 |
| 2,344,908 | Whitman | Mar. 21, 1944 |
| 2,396,594 | Moore | Mar. 12, 1946 |
| 2,429,039 | Warner | Oct. 14, 1947 |